US006732135B1

(12) United States Patent
Samudrala et al.

(10) Patent No.: US 6,732,135 B1
(45) Date of Patent: *May 4, 2004

(54) METHOD AND APPARATUS FOR ACCUMULATING PARTIAL QUOTIENTS IN A DIGITAL PROCESSOR

(75) Inventors: Sridhar Samudrala, Westboro, MA (US); John D. Clouser, Pepperell, MA (US); William R. Grundmann, Hudson, MA (US)

(73) Assignee: Hewlett-Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/494,593

(22) Filed: Jan. 31, 2000

Related U.S. Application Data

(60) Provisional application No. 60/118,130, filed on Feb. 1, 1999, and provisional application No. 60/119,959, filed on Feb. 12, 1999.

(51) Int. Cl.[7] ................................................. G06F 7/52
(52) U.S. Cl. ........................................ 708/654; 708/629
(58) Field of Search ................................. 708/654, 629

(56) References Cited

U.S. PATENT DOCUMENTS

| 4,725,974 | A | * | 2/1988 | Kanazawa | ................ | 708/654 |
|---|---|---|---|---|---|---|
| 4,797,849 | A | * | 1/1989 | Nakano | ................ | 708/654 |
| 4,939,686 | A | | 7/1990 | Fandrianto | | |
| 5,046,038 | A | * | 9/1991 | Briggs et al. | ................ | 708/654 |
| 5,065,352 | A | * | 11/1991 | Nakano | ................ | 708/654 |
| 5,105,378 | A | | 4/1992 | Mori | | |
| 5,128,891 | A | | 7/1992 | Lynch et al. | | |
| 5,365,471 | A | | 11/1994 | Sato | | |
| 5,404,324 | A | | 4/1995 | Colon-Bonet | | |
| 5,467,299 | A | | 11/1995 | Sato et al. | | |
| 5,537,345 | A | | 7/1996 | Nakano | | |
| 5,787,030 | A | | 7/1998 | Prabhu et al. | | |
| 5,798,955 | A | | 8/1998 | Matsubara | | |
| 6,108,682 | A | | 8/2000 | Matheny | | |

OTHER PUBLICATIONS

Koren, I., "Fast Division." In *Computer Arithmetic Algorithms,* (Englewood Cliffs, NJ: Prentice Hall), pp. 127–151.
Koren, I., "Division Through Multiplication." In *Computer Arithmetic Algorithms,* (Englewood Cliffs, NJ: Prentice Hall,) pp. 153–161.
Ren, H., et al, "Design of a 16–Bit CMOS Divider/Square–Root Circuit," *Department of Electrical Engineering, College of Engineering, San Jose State University, San Jose, California:* 807–811 (1993).
Ciminiera, L. and Montuschi, P., "Higher Radix Square Rooting," *IEEE Transactions on Computers,* 39 (10): 1220–1231 (Oct. 1990).
Montuschi, P. and Ciminiera, L., "On the Efficient Implementation of Higher Radix Square Root Algorithms," *Dipartimento di Automatica e Informatica, Politecnico di Torino, corso Duca degli Abruzzi 24, 10129 Torino (Italy),* 154–161.
Burgess, N., "A Fast Division Algorithm for VLSI," *IEEE International Conference on Computer Design: VLSI in Computers and Processors:* 560–563 (1991).
Wong, D. and M. Flynn, "Fast Division Using Accurate Quotient Approximations to Reduce the Number of Iterations," *IEEE Transactions on Computers,* vol. 41, No. 8, Aug. 1992 (pp. 981–995).

* cited by examiner

*Primary Examiner*—David H. Malzahn

(57) ABSTRACT

In a digital processor performing division, quotient accumulation apparatus is formed of a set of muxes and a single carry save adder. Partial quotients are accumulated in carry-save form with proper sign extension. Delay of partial quotient bit fragments from one iteration to a following iteration enables the apparatus to limit use to one carry save adder. By enlarging minimal logic, the quotient accumulation apparatus operates at a rate fast enough to support the rate of fast dividers.

12 Claims, 15 Drawing Sheets

```
    ABBBBBBBBBBBBBBBBBBBBBBBBBBBBBBBBBBBB
    0000000000111111111122222222223333333333
    0012345678901234567890123456789012345678

Qs1 ssssssss...........................
Qc1 cccccccc...........................
             ⊱39a
Qs2 .....sssssssssss...................
Qc2 .....ccccccccccc...................
                  ⊱39b
Qs3 ..........sssssssssss..............
Qc3 ..........ccccccccccc..............
                       ⊱39c
Qs4 ...............sssssssssss.........
Qc4 ...............ccccccccccc.........
                            ⊱39d
Qs5 ....................sssssssssss
Qc5 ....................ccccccccccc
```

FIG. 3

|                      |    |                    | Booth recoded multiplier |              |
|----------------------|----|--------------------|--------------------------|--------------|
| partial product 1    |    | 000000 1000110     | (+1) * 2^0               | * multiplicand |
| partial product 2    | 43 | 1111 01111001      | (-1) * 2^2               | * multiplicand |
| partial product 3    |    | 00 1000110         | (+1) * 2^4               | * multiplicand |
|                      |    |                    |                          |              |
| sum                  | s  | 110101 1000010     |                          |              |
|                      | c  | 010000 1100100     |                          |              |
|                      |    | ------------------ |                          |              |
| binary               |    | 000111 0001010     |                          |              |
|                      | 41 | ↳ note that carry out is discarded |          |              |

FIG. 4

```
        sssssssssss  = ...........11000001010
        ccccccccccc  = ...........01000000000
                       _____
incorrect binary sum = 00000000001000000001010
                                51      this bit is wrong
```

FIG. 5A

```
                          54a
        sssssssssss  = 11111111111111000001010
        ccccccccccc  = 000000000000 1000000000
                          54b
                       _____
  correct binary sum = 000000000000 0000001010
                                         54c
                  53     carry out is properly discarded
```

FIG. 5B

```
      ABBBBBBBBBBBBBBBBBBBBBBBBBBBBBBBBBBBB
      000000000011111111112222222222333333333
      001234567890123456789012345678901234567 8
Qs1   sssssssss...........................
Qc1   ccccccccc...........................
sx1   ....................................

Qs2   .....sssssssssss....................
Qc2   .....ccccccccccc....................
sx2   xxxxx...............................

Qs3   ...........sssssssssss..............
Qc3   ...........ccccccccccc..............
sx3   xxxxxxxxxxx.........................

Qs4   .................sssssssssss........
Qc4   .................ccccccccccc........
sx4   xxxxxxxxxxxxxxxxx...................

Qs5   .......................sssssssssss
Qc5   .......................ccccccccccc
sx5   xxxxxxxxxxxxxxxxxxxxxxx............
```

FIG. 6

CANCELLING A STRING OF 1'S BY ADDING A SINGLE 1

```
                    ┌─80
11110000       11110000
       0              1
────────       ────────
11110000       00000000
               ↑
               └ THE CARRY OUT IS DISCARDED
```

FIG. 8

```
    ABBBBBBBBBBBBBBBBBBBBBBBBBBBBBBBBBBBB
    000000000011111111112222222222333333333
    001234567890123456789012345678901234568
x1  ......................................

```
     ABBBBBBBBBBBBBBBBBBBBBBBBBBBBBBBBBBB
     00000000000111111111122222222223333333
     0012345678901234567890123456789012345678
x1   ........................................
x2   11111...................................
x3   111111111111............................
x4   11111111111111111111....................
x5   1111111111111111111111111111............
     ----------------------------------------
x    1111011111101111111011111110000000000000
     └─┬─┘└──┬──┘└──┬──┘└──┬──┘
       88     90     92     93
```

FIG. 10

```
     ABBBBBBBBBBBBBBBBBBBBBBBBBBBBBBBBBBB
     00000000000111111111122222222223333333
     0012345678901234567890123456789012345678
n2       N
n3            N
n4                  N
n5                             N
```

FIG. 11

```
     ABBBBBBBBBBBBBBBBBBBBBBBBBBBBBBBBBBB
     00000000000111111111122222222223333333
     0012345678901234567890123456789012345678
x    1111011111101111111011111110000000000000
sx1  11110111................................
sx2  ....N...11110111........................
sx3  ...........N...11110111.................
sx4  ..................N...11110000..........
```

FIG. 12

```
       ABBBBBBBBBBBBBBBBBBBBBBBBBBBBBBBBBBBB
       00000000011111111112222222222333333333
       001234567890123456789012345678901234567 8
Qs1    ssssssss.........................................
Qc1    ccccccc...........................................
           47
Qs2    ....ssssssssss....................................
Qc2    ......ccccccc.....................................
            49        62
Qc2'   .........ccc...............................  DELAYED PORTION OF Qc2
Qs3    ..........sssssssss...............................
                         64
Qc3    .............ccccccc..............................
                72   74
Qc3'   ................ccc........................  DELAYED PORTION OF Qc3
Qs4    ...................sssssssss......................
Qc4    ......................ccccccc....................
Qc4'   .........................ccc...............  DELAYED PORTION OF Qc4
Qs5    ............................sssssssss.............
Qc5    ...............................ccccccc...........
Qc5'   ..................................ccc.......  DELAYED PORTION OF Qc5
```

FIG. 13

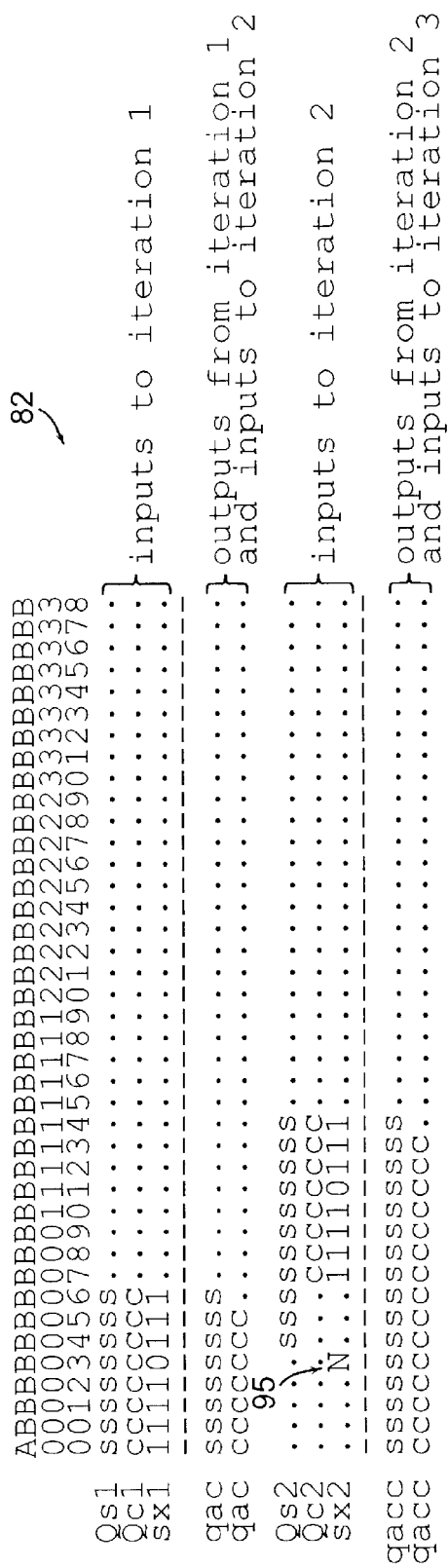

FIG. 14A-2

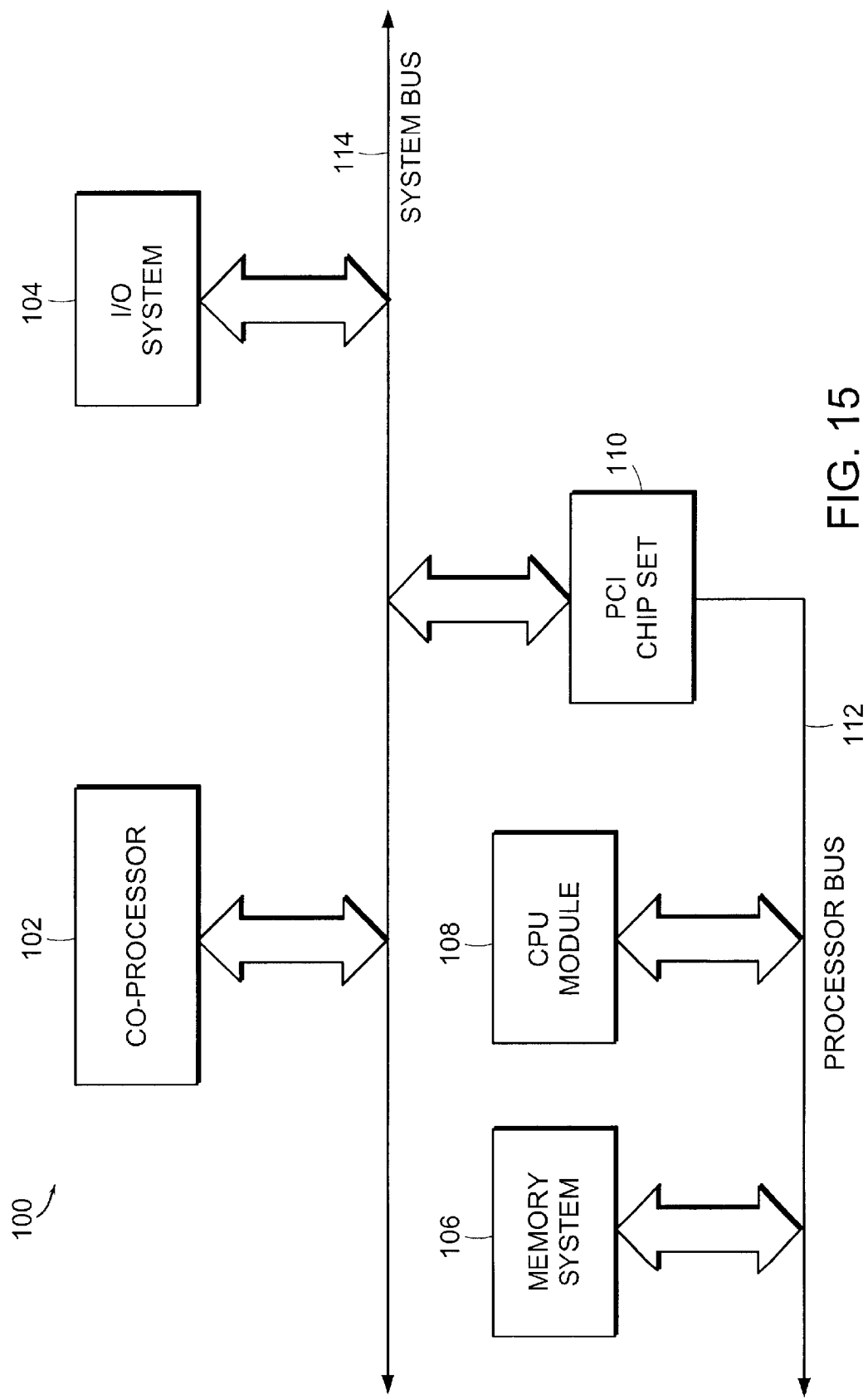

US 6,732,135 B1

METHOD AND APPARATUS FOR ACCUMULATING PARTIAL QUOTIENTS IN A DIGITAL PROCESSOR

RELATED APPLICATION(S)

This application claims the benefit of U.S. Provisional Application No. 60/118,130 filed Feb. 1, 1999 entitled "A General Push-Pull Cascode Logic Technique", and U.S. Provisional Application No. 60/119,959 filed Feb. 12, 1999 entitled "Method for Adding Signed Digit and Binary Numbers and Method for Doubling A Signed Digit Number" the entire teachings of which are incorporated herein by reference.

BACKGROUND OF THE INVENTION

Generally mathematical operations in a computer such as, (i) division of a dividend by a divisor to produce a quotient and (ii) square root of a radicand to produce a root, are slow. Such division and square root operations are slow because they require iteratively generating a series of partial remainders, and quotient or root digits respectively.

Therefore, the speed of the division or square root operation is dependent on the amount of time it takes to complete one iteration and the total number of iterations required. The total number of iterations is dependent on the number of quotient or root mantissa digits required to provide an accurate quotient or root. For example, in floating point division twenty-four mantissa digits are required for single precision and fifty-three mantissa digits are required for double-precision, therefore the time required to generate each of the required quotient digits is critical to the overall speed of the division operation.

Typically, in each iteration of a square root operation, a root digit and a correction term are computed after examining a current partial remainder. The succeeding or partial remainder for the next iteration is computed by subtracting the correction term from the current partial remainder and scaling the result of the subtraction. In each iteration of a division operation, a quotient digit is computed after comparing a current partial remainder and the divisor. The partial remainder for the next iteration is computed by subtracting a multiple of the divisor from the current partial remainder and scaling the result of the subtraction.

Thus, the computation of the partial remainder for the next iteration for both the square root operation and the division operation requires a subtraction operation. Typically the subtraction is performed through the use of Carry Propagate Adders ("CPA") or Carry Save Adders ("CSA"). CPAs are relatively slow because a carry bit must be propagated from the Least Significant Bit ("LSB") CPA to the Most Significant Bit ("MSB") CPA. CSAs are much faster but because they present the partial remainder as separate sum and carry binary numbers which must be added, examination of the partial remainder is slower and more complicated.

The tradeoff between examination speed and subtraction efficient speed (CPA and CSAs) is a long standing issue faced by computer divider and square root designers. Another long standing issue is the accumulation of root digit and quotient digits. The rate of accumulation of partial roots and/or quotients needs to be fast enough to support the rate of the main square root/division loop. This in turn determines how fast the overall square root/division operation is performed.

SUMMARY OF THE INVENTION

The present invention describes a method and apparatus for accumulating quotient and/or square root digits in an efficient manner. In particular, the present invention accumulates the quotient in carry-save form along with proper sign extension, using only one carry-save adder. By using minimal logic in the accumulation loop, the present invention provides a method and apparatus for accumulating partial quotients at a rate fast enough to support the rate of fast dividers.

In the preferred embodiment, a digital processor preforms a division operation on a dividend in a main loop. From this, quotient digits (i.e., partial quotients) are produced. A quotient accumulates receives and properly reconciles the quotient digits across all iterations in an efficient manner as follows.

The quotient accumulator is formed of a set of multiplexes coupled to a single carry-save adder. The multiplexes receive as input, prior accumulated quotient digits, partial quotient digits output from the main loop and sign extension digits corresponding to the partial quotient digits. The number of outputs of the multiplexes is less than the number of inputs.

The single carry-save adder receives as inputs the outputs from the multiplexes which number within the range acceptable by the carry-save adder. The carry-save adder produces than appropriate accumulated quotient and preferably at a rate fast enough to support the rate of the main loop.

Preferably the partial quotient digits output from the main loop and input to the multiplexes is in carry-save format. The partial quotient digits may include sum bits and carry bits from one iteration of the main loop and carry bits delayed from a prior iteration.

In accordance with one feature of the present invention, the sign extension digits are bit (possible fragmented bit strips) from a single constant value representing sign extensions of all partial quotients. Further included in the sign extension digits are switch bits for changing a strip of logic ones to logic zeros.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 is a schematic illustration of the quotient accumulator adding its partial quotient carry and sum input vectors ($Qc_i$ and $Qs_i$), respectively without sign extension.

FIG. 4 is an illustration of a negative partial product in which case a carry out bit is discarded.

FIGS. 5a and 5b are illustrations of an incorrect propagating carry bit and a correct carry out bit, respectively.

FIG. 6 is a schematic illustration of the quotient accumulator of FIG. 3 with sign extension.

FIG. 8 is an illustration of the cancelling of a string of 1's by adding a single 1 to the least significant bit of the string.

FIG. 9 illustrates the collecting of sign extension bits from FIG. 7b and adding of switch bits.

FIG. 10 illustrates computing a single constant value for the collected sign extensions of FIG. 9.

FIG. 11 illustrates designating certain bit positions of FIG. 10 as switch bits.

FIG. 12 illustrates the single constant value of FIG. 10 split into fragments for combining with switch bits of FIG. 11.

FIG. 13 illustrates FIG. 7b modified to show delayed addition of the quotient carry inputs to the quotient accumulator.

FIG. 14a is an illustration of a quotient accumulator employing both the collapsing of sign extension bits into a single constant value as fragmented in FIG. 12 and the delaying of addition of quotient carry inputs of FIG. 13.

FIG. 15 is a block diagram of a computer system in which the present invention may be used.

DETAILED DESCRIPTION OF THE INVENTION

Figure 1:
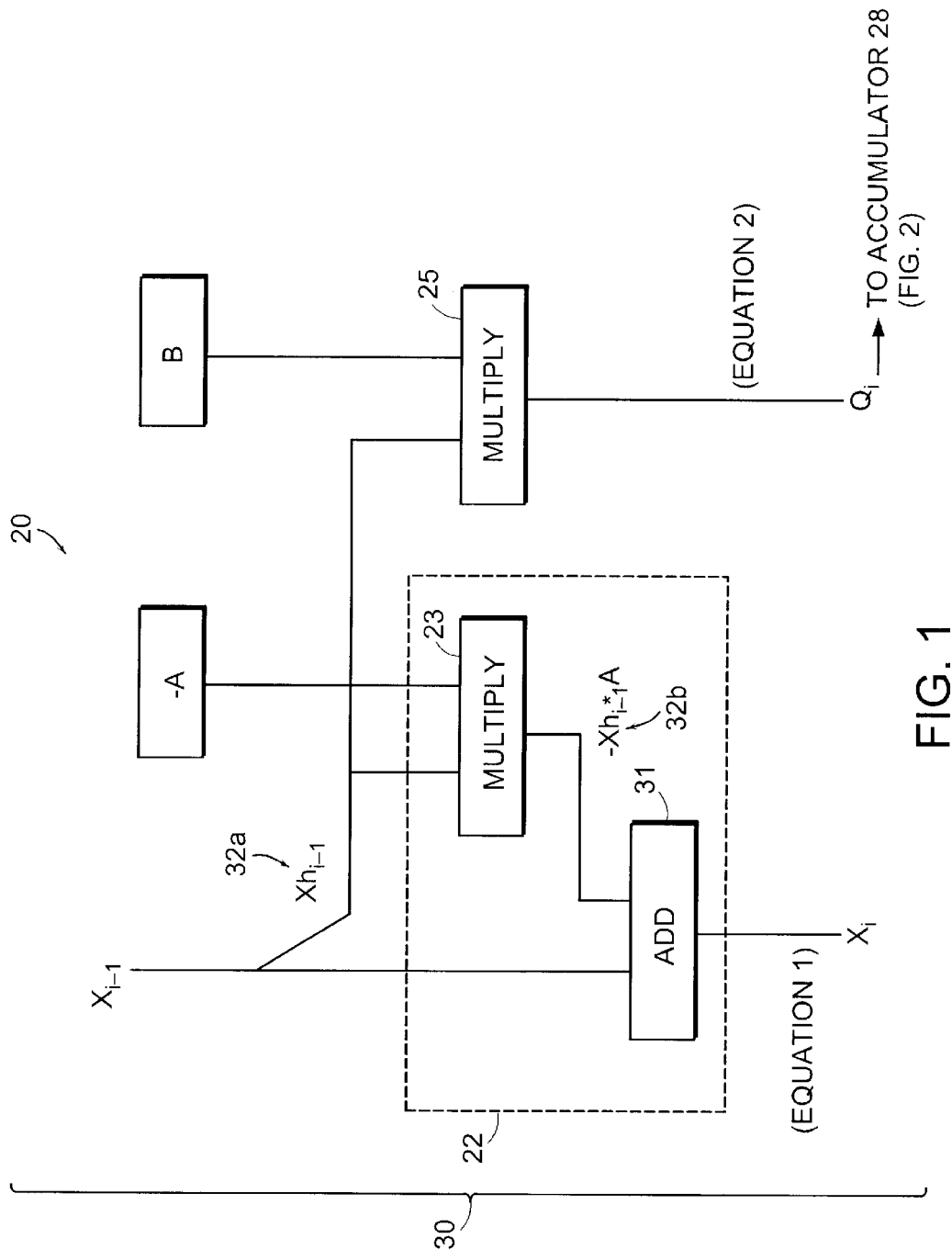
FIG. 1 is a schematic diagram of a divider operation main loop which generates partial quotients.

FIG. 15 is a block diagram of a typical computer system 100 in which the present invention is utilized. Included in the computer system 100 are a Central Processing Unit ("CPU") module 108, a memory system 106 and a PCI chip set 110 connected by a processor bus 112. The PCI chip set 110 is further connected to an Input/Output ("I/O") system 104 and a co-processor module 102 by a system bus 114.

Figure 16:
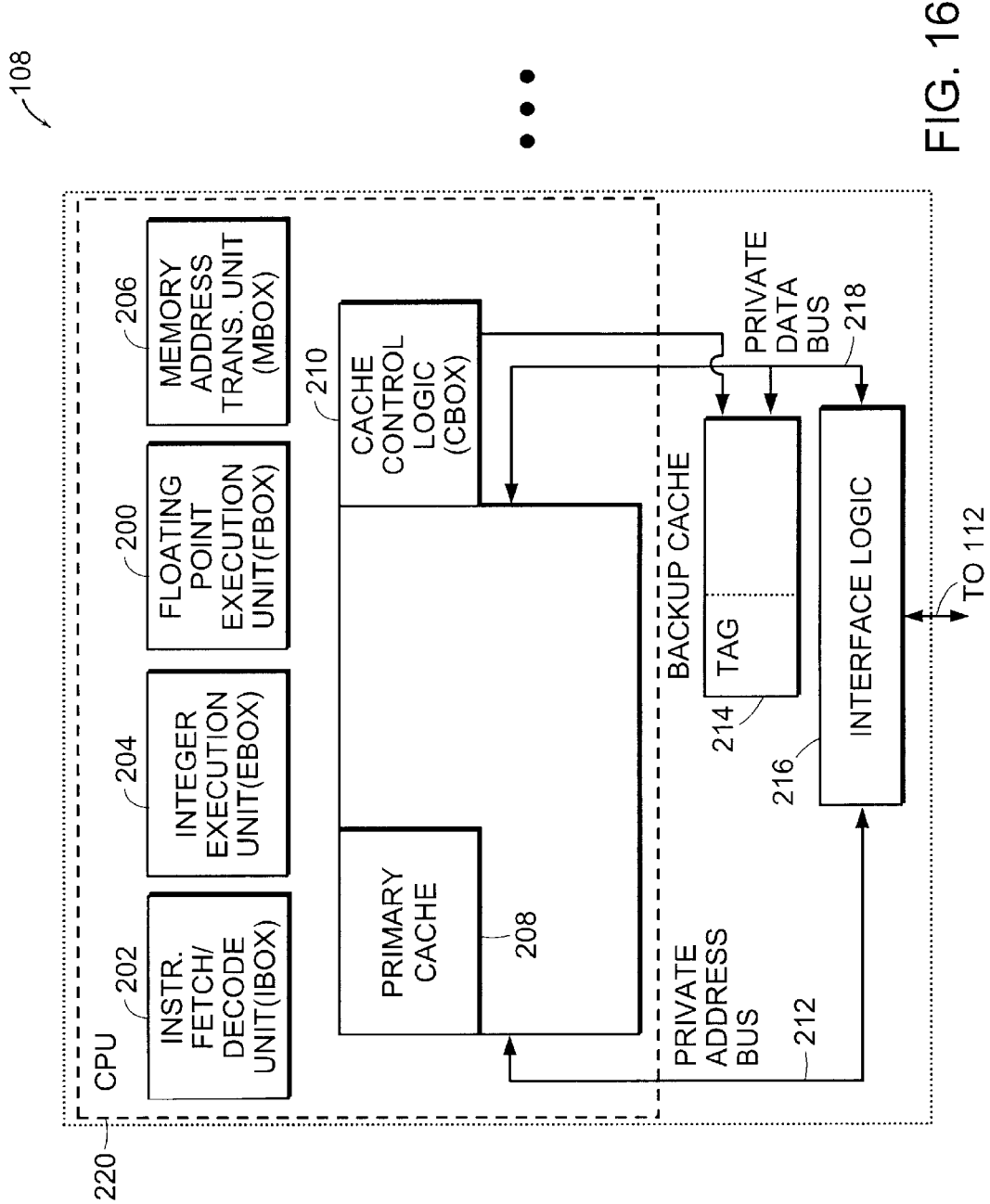
FIG. 16 is a block diagram of the CPU module shown in FIG. 15.

FIG. 16 shows the CPU module 108 shown in FIG. 15. The CPU module 108 includes a CPU 220, a backup cache 214 and a processor bus interface logic 216 connected by a private address bus 212 and a private data bus 218. The processor bus interface logic 216 connects the CPU module 108 to the processor bus 112(FIG. 15). The CPU 220 includes a primary cache 208 and a cache control (CBOX) logic 210. The cache control logic (CBOX) 210 controls the primary cache 208 in the CPU 220 and the backup cache 214.

CPU 220 further includes logic circuits to enable it to perform operations for the computer system 100. An Instruction Fetch and Decode Unit (IBOX) 202 performs instruction prefetch, decode, branch prediction, instruction issuance and interrupt handling operations. An Integer Execution Unit (EBOX) 204 performs mathematical operations on integer values such as, addition, shifting, byte manipulation, and multiplication. A Floating Point Execution Unit (FBOX) 200 performs mathematical operations on floating point values such as, square root, division and multiplication. A Memory Management Unit (MBOX) 206 performs memory address translation, for example, from virtual memory addresses to physical memory addresses.

The present invention is directed to the division operation (divider) by the Floating Point Execution Unit 200. The preferred divider uses an algorithm of reciprocal approximation followed by several iterations of multiplication that produce a series of partial quotient bits. The rate of accumulation of the partial quotients needs to be fast enough to support the rate of the main loop, which in turn determines how fast the divider performs its task. To that end, the preferred embodiment is an implementation of a minimal amount of logic in the accumulator loop.

By way of background and with reference to FIG. 1, the divider 20 (from Fbox 200) produces in each iteration a partial remainder $X_i$ and a partial quotient $Q_i$. The partial remainder $X_i$ and the partial quotient $Q_i$ are generated using two multipliers 23,25. The partial quotient bits from each iteration must be assimilated to form the final quotient. A high speed multiplier is used in both instances to cut the iteration time to one cycle.

Figure 2:
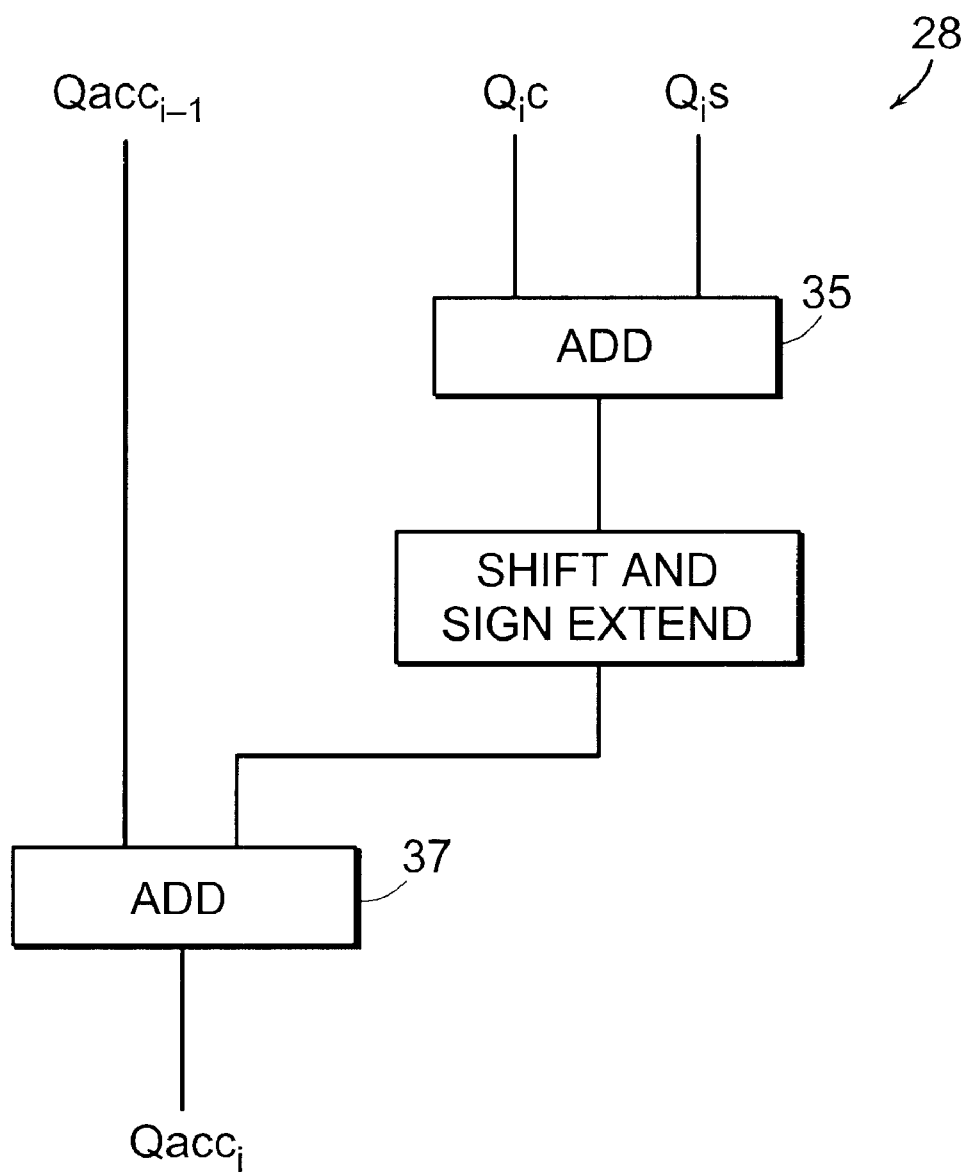
FIG. 2 is a schematic diagram of a quotient accumulator which receives the partial quotients generated in FIG. 1.

To implement a high speed multiplier, it is necessary to represent the product in carry-save form, and therefore the partial quotients $Q_i$ are represented in carry-save form and must be accepted in that form. In addition, the partial quotients $Q_i$ from each iteration ioverlap somewhat and this must be handled by a quotient accumulator 28 (FIG. 2).

Although the partial quotients $Q_i$ always take non-negative values, the carry-save representation requires careful handling of the sign extension of the partial products, since the high speed design uses a Booth recode that includes negative partial products. This sign extension is visible at the partial quotient output and must be allowed to "ripple off the top" of the sum without corrupting the accumulated quotient in quotient accumulator 28 (FIG. 2).

The output of the accumulator 28 can be in carry-save form where a subsequent rounding circuitry is designed to accept input in carry-save form for other reasons.

The full details of the division algorithm are found in the related applications specified above and herein incorporated by reference.

For the purposes of explaining the quotient accumulator 28 of the present invention, the divider 20 performs the following operations on each iteration.

B is the approximate reciprocal of the upper m bits of the divisor. It is an iteration invariant binary value.

A is the product of B and the divisor. It is an iteration invariant binary value.

$X_{i-1}$ is the partial remainder from the previous iteration in i-1 carry-save form.

$Xh_{i-1}$ is the upper m bits of $X_{i-1}$ in carry-save form.

$Q_i$ is the partial quotient from the ith iteration in carry-save form.

The carry-save output of the iteration (to be fed into the next pass) is $$X_i = X_{i-1} - (Xh_{i-1} * A) \quad \text{(equation 1)}$$

The carry-save partial quotient produced by each iteration is $$Q_i = Xh_{i-1} * B \quad \text{(equation 2)}$$

The invention quotient accumulator 28 described here receives $Q_i$ as its input.

The complete quotient is $$Q = \sum_{i=1}^{I} Q_i * 2^{-i(m-2)} \quad \text{(equation 3)}$$

where $$I = \frac{\text{Precision}}{(m-2)}$$

the total number of iterations required by the desired precision of the result.

FIG. 1 shows how equations 1 and 2 are implemented. The multiplication and subtraction that forms each partial remainder $X_i$ (equation 1) is the critical operation that determines the speed of the overall division computation. The accumulation of the partial quotients $Q_i$ in accumulator 28 to form the quotient Q (equation 3) must not be the limiting factor.

To make the partial remainder loop 30 fast, a redundant representation 32a, b is used for $X_i$. Carry-save adders are used to implement the multiplier 23, and the output remains in carry save form for the input to the next iteration.

The quotient multiplier 25 (equation 2) is also implemented with carry-save adders. This means that the $Q_i$ value that is input to the quotient accumulator 28 will be in carry-save form and must be accepted in that form.

On each iteration, new partial quotient bits $Q_i$ are created and are to be added to the accumulating quotient Q (equation 3). A few of the high order bits overlap the bits already added from the previous iteration. Another characteristic of the generations of equations 1–3 is that quotient bits from later iterations have the possibility of generating carries that may propagate up into bits from earlier iterations.

The adder 31 in the partial remainder loop 30 is merged into the partial product adders of the multiplier 22 shown in dotted lines in FIG. 1.

FIG. 2 shows a simplistic implementation of a quotient accumulator 28 (not employing the present invention). There, $Qacc_{i-1}$ is the accumulated quotient from the previous iterations; $Qacc_i$ is the new accumulated quotient resulting from the main adder 37 of quotient accumulator 28. Accumulated partial quotient $Qacc_i$ is to be represented as carry and sum vectors for addition with with $Qc_i$ and $Qs_i$ the partial quotient carry and sum vectors respectively input to the next interaction.

The approach of FIG. 2 would add extra hardware and extra delay to the division latency as follows. Since the partial quotient $Q_i$ value is in carry-save form, a separate/second adder 35 is needed to reduce it to binary first. The delay of two series binary adders 35,37 would be prohibitive.

FIG. 3 shows how the $Qc_i$ and $Qs_i$ inputs need to be added. The bit weights are indicated by the columns with the most significant bit (MSB) starting on the left and ranging down to the least significant bit (LSB) on the right. The columns are labeled with a notation that indicates the bit weights.

$$\text{value} = A00\ 2^0 + B00\ 2^{-1} + B01\ 2^{-2} + B02\ 2^{-3} + B03\ 2^{-4} + B04\ 2^{-5} +$$

The division operation completes (m−2) bits of quotient per iteration. Each partial quotient $Q_i$ is (m+1) bits wide. In this example, m=10, so 8 bits of quotient are being completed per iteration. Because 11 bits are produced per iteration, there is a three bit overlap between succeeding partial quotients as illustrated at 39a,b,c and d.

Qs1 and Qc1 are the values of $Qs_i$ and $Qc_i$ when i=1 (in other words, from the first iteration). Qs2 and Qc2 are the values of $Qs_i$ and $Qc_i$ when i=2 (from the second iteration) and so forth. Each $Qc_i$ is shown shifted left to match their corresponding weights. Also the partial quotient inputs $Qs_i$ and $Qc_i$ (sum and carry, respectively) are represented without sign extension as will be discussed below. Note the three bit overlap.

There is a subtle problem here that may not be readily apparent. Although each iteration's $Q_i$ output represents a positive number, sometimes the carry-save representation has an implicit carry out that is to be discarded. This can occur during the course of multiplication using Booth recoding; if any of the partial products is negative, there will be a carry out that is to be discarded.

This means that the total sum of the values shown in FIG. 3 will be incorrect. In FIG. 3 only 40 bits are shown for simplicity; it is understood that double precision floating-point values require 56 bits.

An example of a negative partial product 43 is shown in FIG. 4. The carry out 41 is discarded as part of the completion of the 2's complement value of the negative partial products 43.

These carry outs 41 (i.e., the ones that are to be discarded due to a negative partial product 43) are indistinguishable from carries propagating across from bits that have previously been inserted into the quotient accumulator 28. An example of this problem in distinguishing between negative carry bits 5' and inserted positive carry bits 53 is shown in FIG. 5a. To solve this problem, the proper sign extension 54 a,b,c must be included in the addends and sum as shown in FIG. 5b.

Referring back to FIG. 3, the partial quotient inputs $Qs_i$ and $Qc_i$ are corrected by including the required sign extension bits ($sx_i$). This is shown in FIG. 6. The value at line sx2 is the sign extension associated with Qs2, Qc2 (i.e., partial quotient sum and carry of the second iteration). The value at line sx3 is the sign extension associated with Qs3, Qc3 (partial quotient sum and carry of the third iteration) and so forth. The sign extension bits ($Sx_i$) are indicated by 'x'. The sum total of all these partial products and their sign extensions is equal to the correct quotient.

Figure 7A:
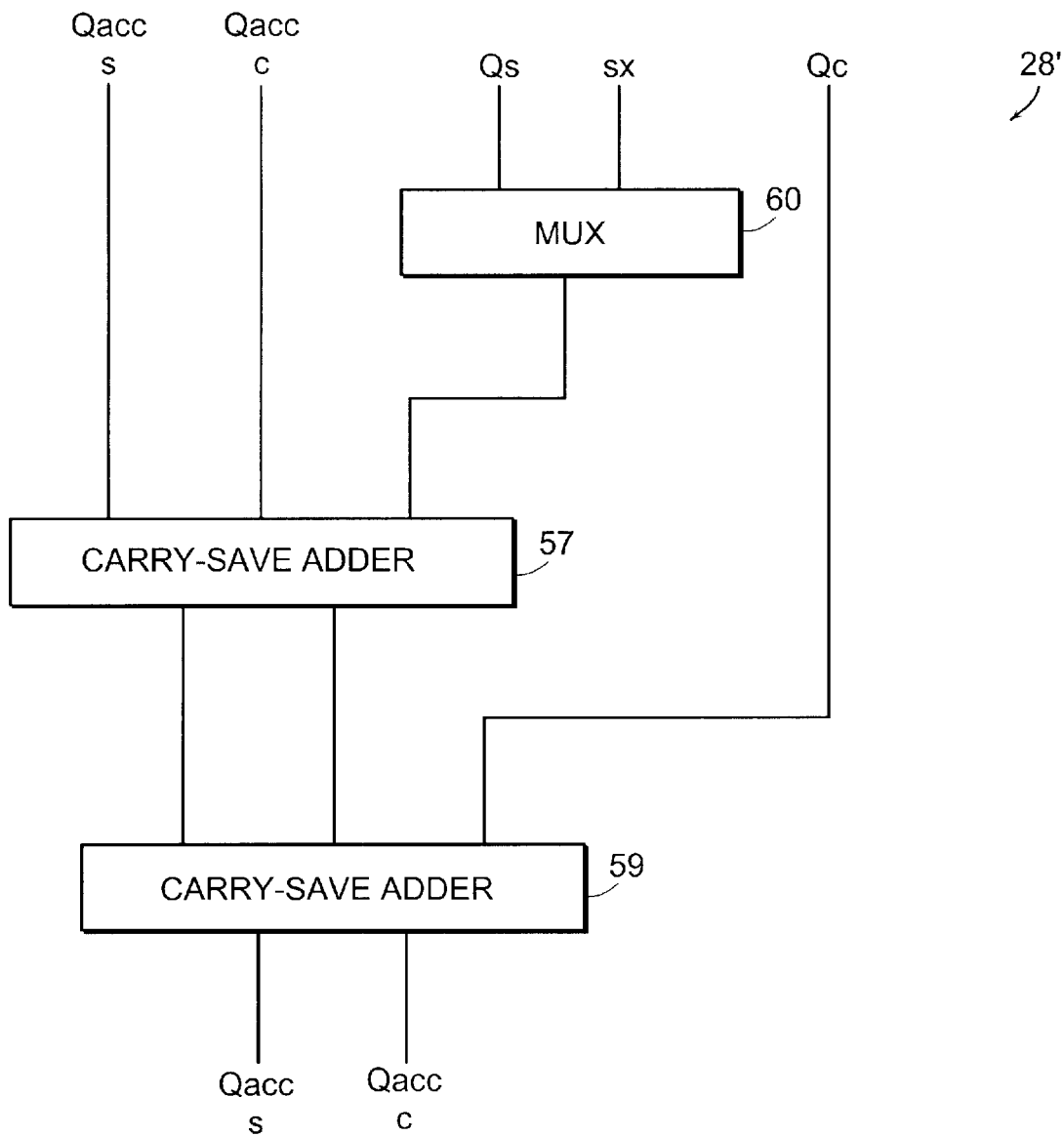
FIG. 7a is a schematic diagram of a reduction circuit for each iteration of the quotient accumulator of FIG. 6.

FIG. 7a shows a brute force reduction of these bits (i.e., accumulated quotient bits Qacci (carry and sum), partial quotient bits $Q_i$ (carry and sum and sign extension bits $sx_i$) to a single carry-save pair. That reduction requires two carry-save adders 57, 59 in series per iteration. A multiplexer 60 provides the proper sign extension for the partial quotient sum vector $Q_s$. This is because there are as many as four inputs at certain bit weights for certain iterations i.

Figure 7B:
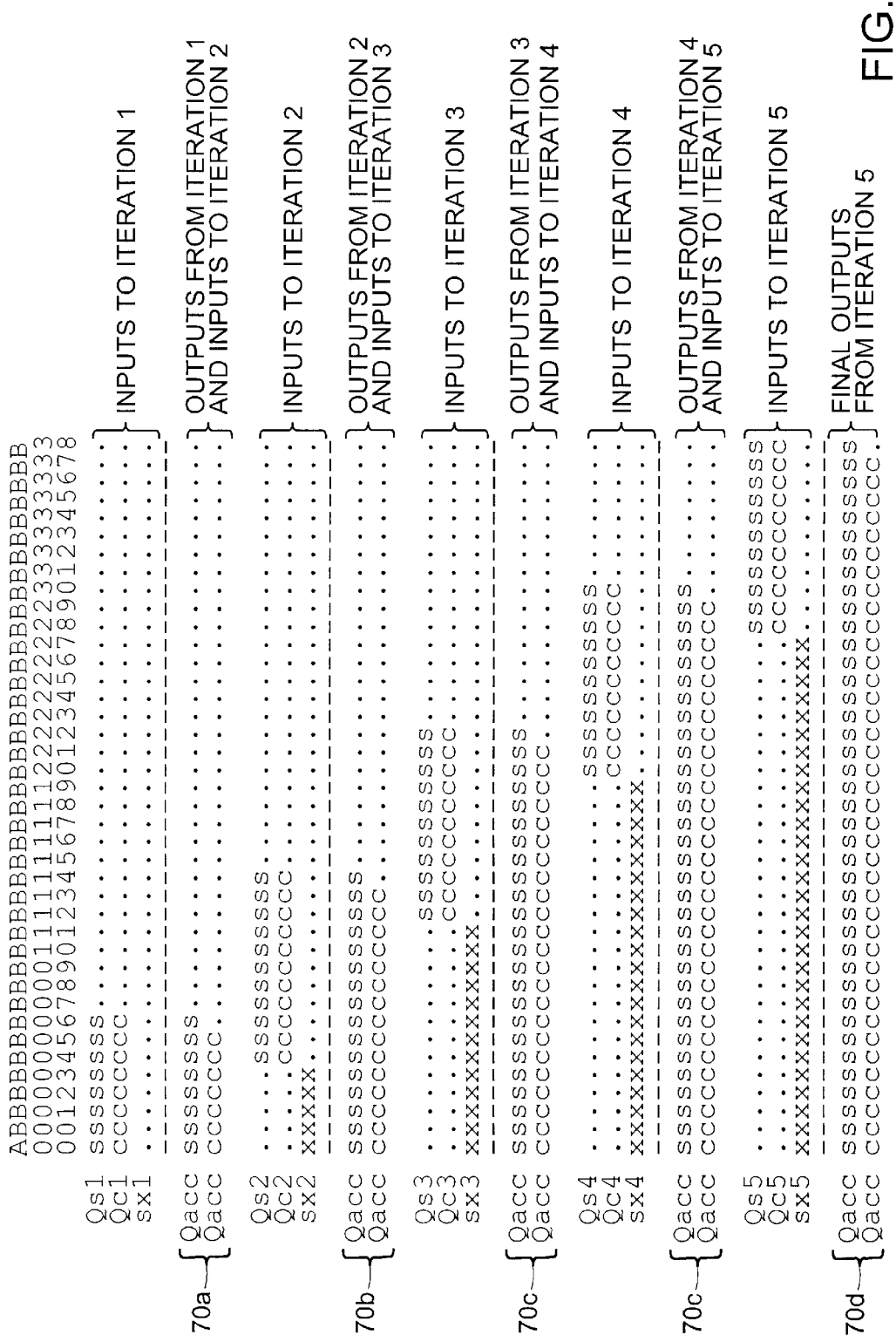
FIG. 7b illustrates the relative bit weighings of the input carry and sum bits, sign extension bit and quotient accumulator output bits in each iteration of the quotient accumulator.

FIG. 7b shows the relative bit weightings of the Qacc, Qs, Qc and sx values for each iteration i. The quotient accumulator 28, output (Qacci) 70 a,b,c,d for each iteration is represented in carry-save form, and feeds into the next iteration as two inputs (i.e., a sum inputs and a carry input.

Also note that the sign extension will add significant loading to the MSB (most significant bit) of the partial quotients.

It is clear that attempting to add all these bits by brute force is not going to be possible under the timing constraint set by the partial remainder loop time.

The present invention provides a solution to the foregoing sign extension problem. More specifically, the invention includes a method of implementing sign extension quickly with minimal hardware.

FIG. 8 shows that a series of 1's can be canceled by adding a single 1 at the appropriate bit position 80. That is, the least significant bit position 80 in the series of 1's provides a switch position as further described below.

The present invention extracts the sign extension bits (at lines $sx_i$) from FIG. 7b and adds single logic 1 bits that are used as switches. This is shown in FIG. 9. The single "switch bits" are indicated with N in corresponding ni lines. The values at lines $x_i$ correspond to the sign extension bits of lines $sx_i$ in FIG. 7b.

The foregoing allows adding all the possible sign extensions into a single constant value and using single bits added to the sum total to switch the sign extensions (strings of 1's) to zero's as needed. FIG. 10 shows the totalling of all the sign extension ($x_i$) bits of FIG. 9 into a single value x. Note the four distinct strings 88,90,92,93 of ones in the resulting x. The zeros before and/or immediately after each string 88,90,92,93 of ones rep mark the bit positions to be used to switch the sign extensions to zeros as desired. In particular, bit positions 03,11,19 and 27 are switch bit positions.

FIG. 11 summarizes these bit positions where the "switch bits" are to be located. Shown are switch bit n2 at bit position 03, switch bit n3 at bit position 11, switch bit n4 is at bit position 19, and switch bit n5 is at bit position 28.

Finally, the single constant value x (computed in FIG. 10 for all sign extensions) does not need to be added in all at once. It can be added in fragments sxi, sx2, sx3, sx4 and still yield the proper final sum as shown in FIG. 12. The single constant value X is split up into fragments and combined with the switch bits, n2,n3,n4,n5 of FIG. 11. Preferably, the fragments are chosen in such a way to merge in conveniently with the bits described next.

As stated above, the invention is a method of accumulating the overlapping partial quotient within the time constraint of the partial remainder loop. Since a carry-save adder can accept only three inputs, and there are two inputs in use from the previous iteration (i.e., accumulated quotient Qacc, carry and corresponding sum), there is only one free input available. But there are two more inputs (i.e., partial quotient sum Qs and partial quotient carry Qc) to be added due to the three bit overlap of the partial quotients from one iteration to the next.

The invention solution is to delay adding one of the overlapped inputs until the next iteration when the carry-save adder input with the required bit weighting is free. This is shown in FIG. 13 which is an illustration of FIG. 7b modified to show delayed addition of a few of the partial quotient carry (Qc) inputs to the quotient accumulator 28.

At the bit weightings where both an "s" and a "c" input are shown in the same iteration of FIG. 13, there is no accumulated sum yet. So all three carry-save adder inputs are available at these bits positions during the given iteration. Thus at 62 in the second iteration there are no accumulated quotient bits $Qacc_2$. As such, these bits 62 of partial quotient sum Qs2 and partial quotient carry $Qc_2$ are input to the carry-saver adder. The partial quotient sum bits at 47 provide the third input to the carry-save adder where partial quotient sum at carry bits of the prior iteration (Qs1 and Qs2) provide the other of two inputs during the second iteration. Consequently there are no inputs to the carry-save adder available for partial quotient carry bits/fragment 49. To that end Qc2i bits 49 are delayed until the third iteration.

In the third iteration, partial quotient sum and carry bits 64 (Qs3, Qc3) are in bit positions where there are no accumulated quotient bits $Qacc_3$. Thus these bits 64(Qs3, Qc3 in part) are input to the carry-save adder. The partial quotient sum bits 72 provide the third input to the carry-save adder where partial quotient sum and carry Qs2 and Qc2 bits of the second (i.e., prior) iteration provide the other two inputs. Thus there is no input to the carry-save adder available for partial quotient carry bits 74 (Qc3'). As such, these Qc3' bits 74 are delayed until the next iteration, and so on.

FIG. 14a shows how to combine both methods (sign extension of FIGS. 9–12 and delayed partial quotient carry input add of FIG. 13) to create the quotient accumulator 82 implementation of the preferred embodiment.

With such a combination, there are at most three inputs at any time per bit position, so a single carry-save adder 86 is sufficient.

In particular, iteration 1 has 8 bits of input from the partial quotient sum and carry vectors (Qs1 and Qc1) and sign extension sx1. Sx1 is a fragment of the single constant value of all sign extensions as extracted and combined in FIGS. 10–12 discussed above.

In iteration 2, bit position 3s has three inputs: accumulated quotient sum bit (Qacc s1), output from interation 1, accumulated quotient carry bit (Qcc1) output from iteration 1 and switch bit 95 determined by the end of the most significant bit string of 1's in sx1 (sign extension of iteration 1).

Also in iteration 2, but positions 04 through 06 have three inputs: accumulated quotient sum bits (Qacc S1) output from iteration 1, accumulated quotient carry bits (Qacc c1) content from interation1 and partial quotient sum bits Qs2 introduced in iteration 2. Also in these bit positions, note that a fragment of partial quotient carry bits 49 (Qc2') from iteration 2 is delayed until the third iteration as explained above in FIG. 13. The remaining bit positions 08 through 14 have inputs from partial quotient sum, carry and sign extension bits introduced in iteration 2.

Similarly for iteration 3, each bit position has no more than 3 inputs to the carry-save adder 86. Switch bit 97 is in the bit position of the logic zero ending the second string of ones in the constant value of all sign extensions with a corresponding fragment at sx2 in iteration 2. Partial quotient carry bit fragment 74 is delayed until iteration 4. This allows the accumulated quotient sum and carry bits output from iteration 2 and the partial quotient sum bits of iteration 3 in bit positions 12 through 14 to be the only three inputs to carry-save adder 86.

And so forth for iterations 4,5 and 6. As a result, there are only 3 inputs to carry-save adder 86 at any given time (in the various bit positions). So all that is required is a single carry-save adder.

Figure 14B:
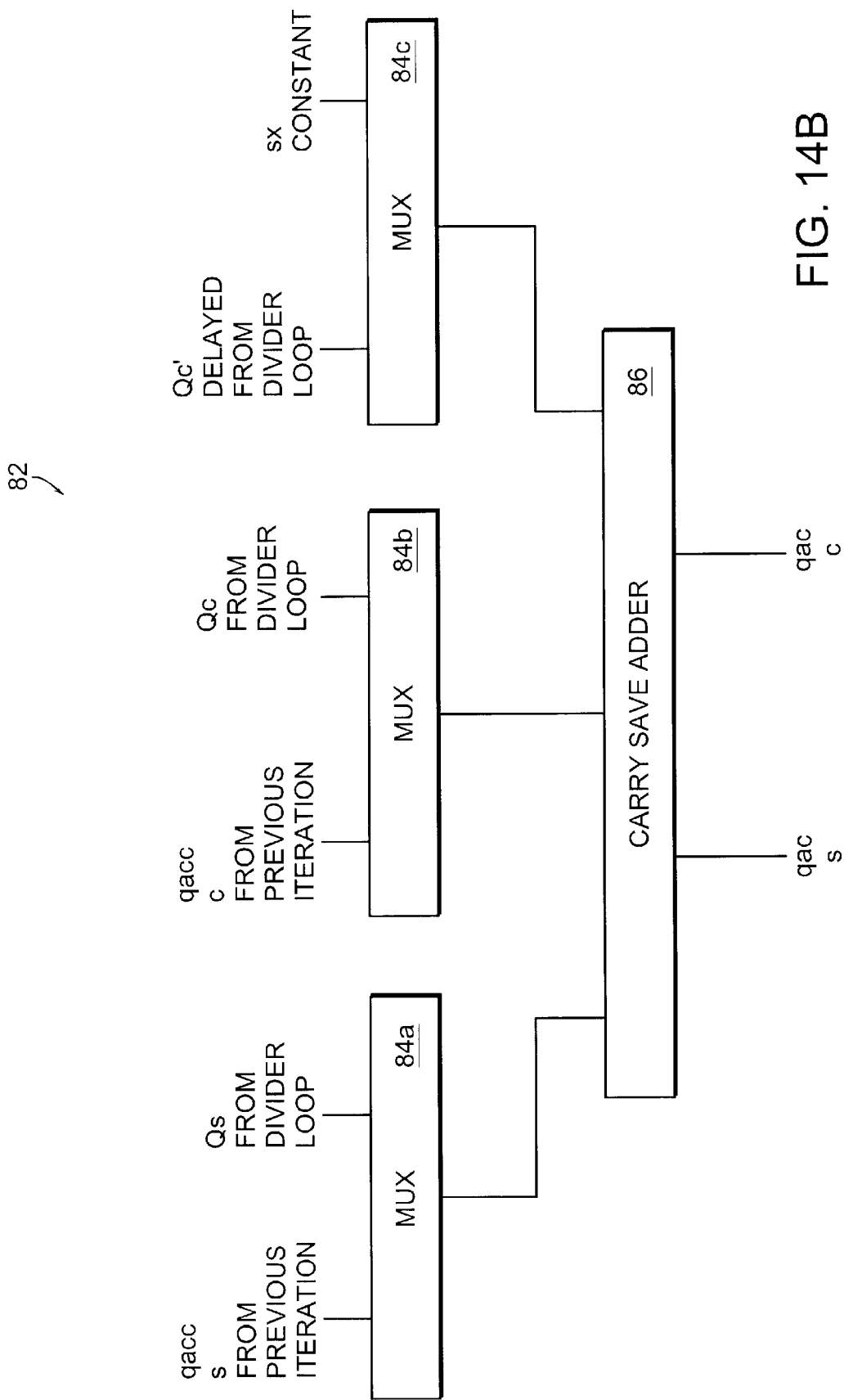
FIG. 14b is a block diagram of the quotient accumulator of FIG. 14a implemented with multiplexes feeding into a single carry save adder in the preferred embodiment of the present invention.

FIG. 14b is illustrative of a mux 84 a,b,c and single carry-save adder 86 cenfiguration implementing the present invention. Muxes 84a,b,c are utilized to steer the bits partial quotient Qs, Qc (sum and carry), accumulated quotient Qacc (sum and carry), delayed partial quotient carry Qc and sign extensions as a constant single value sx bit into each of the carry-save adder 86 inputs.

It is understood that there are alternatives and the implementation of FIG. 14b is for purposes of illustration and not limitation.

The present invention as described above provides improvements in processor cycle time. In particular, the present invention enables the main divide loop time to set the performance requirement of the quotient accumulator for minimal logic and delay.

While this invention has been particularly shown and described with references to preferred embodiments thereof, it will be understood by those skilled in the art that various changes in form and details may be made therein without departing from the scope of the invention encompassed by the appended claims.

What is claimed is:

1. In a digital processor performing a division operation on a dividend in a main loop producing quotient digits, a quotient accumulator comprising:

a set of multiplexers for receiving as input, prior accumulated quotient digits, partial quotient digits output from the main loop and sign extension digits corresponding to the partial quotient digits, the multiplexers producing outputs less in number than the number of inputs; and a single carry save adder coupled to receive as inputs the outputs from the multiplexers, the carry save adder having a limited number of inputs and the number of outputs received from the multiplexers being within the limited number, the carry save adder providing an accumulated quotient.

2. A quotient accumulator as claimed in claim 1 wherein the partial quotient digits output from the main loop and received as input by the multiplexers are in carry-save format.

3. A quotient accumulator as claimed in claim 2 wherein the partial quotient digits include sum bits and carry bits from one iteration of the main loop and carry bits delayed from a prior iteration.

4. A quotient accumulator as claimed in claim 1 wherein the sign extension digits are bits from a single constant value of sign extensions of all partial quotients.

5. A quotient accumulator as claimed in claim 4 wherein the sign extension digits further include switch bits for changing a string of logic ones to logic zeros.

6. A quotient accumulator as claimed in claim 5 wherein bits from the single constant value are input in fragments to the multiplexers.

7. A quotient accumulator as claimed in claim 1 wherein the multiplexers and single carry-save adder accumulates partial quotients at a rate fast enough to support the rate of the main loop.

8. A digital processor logical division method, comprising the steps of:

producing partial quotients and partial remainders in a processing loop, the processing loop operating at a working rate; and accumulating the partial quotient at a rate faster than the working rate such that the step of accumulating is fast enough to support the processing loop, wherein the step of accumulating includes providing proper sign extension of the partial quotients by using a single constant value for sign extensions of all the partial quotients and by using switch bits to switch sign extensions bits as needed.

9. The method of claim 8 wherein the step of using a single constant value includes fragmenting the value into different bits used in different iterations of the accumulating.

10. The method of claim 9 wherein the step of accumulating includes delaying bit portions of partial quotients for input into a carry save adder at different iterations.

11. A digital processor logical division method, comprising the steps of:

producing partial quotients and partial remainders in a processing loop, the processing loop operating at a working rate; and accumulating the partial quotient at a rate faster than the working rate such that the step of accumulating is fast enough to support the processing loop, wherein the step of accumulating includes limiting logic to a single carry save adder and a set of multiplexers providing input to the carry save adder, in a number less than or equal to maximum number of inputs of the carry-save adder.

12. The method of claim 11 wherein the step of accumulating includes delaying bit portions of partial quotients for input into the carry save adder at different iterations.

* * * * *